United States Patent
Discekici et al.

(10) Patent No.: US 12,344,760 B2
(45) Date of Patent: *Jul. 1, 2025

(54) THREE-DIMENSIONAL PRINTING WITH FOOD CONTACT COMPLIANT AGENTS

(71) Applicant: PERIDOT PRINT LLC, Palo Alto, CA (US)

(72) Inventors: Emre Hiro Discekici, San Diego, CA (US); Graciela Emma Negri Jimenez, San Diego, CA (US); Thomas M Sabo, San Diego, CA (US); Jason Christopher Butler, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/926,592

(22) PCT Filed: May 14, 2021

(86) PCT No.: PCT/US2021/032366
§ 371 (c)(1),
(2) Date: Nov. 19, 2022

(87) PCT Pub. No.: WO2021/236427
PCT Pub. Date: Nov. 25, 2021

(65) Prior Publication Data
US 2023/0203338 A1 Jun. 29, 2023

(30) Foreign Application Priority Data

May 22, 2020 (WO) ................ PCT/US2020/034333
Jul. 10, 2020 (WO) ................ PCT/US2020/041622
Oct. 15, 2020 (WO) ................ PCT/US2020/055667

(51) Int. Cl.
*C09D 171/02* (2006.01)
*B29C 64/165* (2017.01)
(Continued)

(52) U.S. Cl.
CPC ............ *C09D 171/02* (2013.01); *B33Y 70/00* (2014.12); *C09D 7/20* (2018.01); *C09D 7/45* (2018.01);
(Continued)

(58) Field of Classification Search
None
See application file for complete search history.

(56) References Cited

U.S. PATENT DOCUMENTS

| 5,393,461 A | 2/1995 | Fillipova |
| 5,957,380 A | 9/1999 | Fitterman et al. |
(Continued)

FOREIGN PATENT DOCUMENTS

| CN | 105985052 A | 10/2016 |
| CN | 110872466 A | 3/2020 |
(Continued)

OTHER PUBLICATIONS

Commission Regulation (EU) No. Oct. 2011 of Jan. 14, 2011 on plastic materials and articles intended to come into contact with food, Official Journal of the European Union, Jan. 15, 2011, 89 pages.

*Primary Examiner* — Susan D Leong
*Assistant Examiner* — Jonathan B Woo
(74) *Attorney, Agent, or Firm* — Dierker & Kavanaugh, P.C.

(57) ABSTRACT

The present disclosure is drawn to food contact compliant three-dimensional printing kits and systems. In one example, a multi-fluid kit of food contact compliant agents for three-dimensional printing can include a food contact compliant (Continued)

fusing agent and a food contact compliant detailing agent. The fusing agent can include from about 70 wt % to about 96 wt % water, a food contact compliant carbon black dispersion in an amount of from about 3 wt % to about 10 wt % by solids weight of the carbon black dispersion, and food grade propylene glycol in an amount from about 1 wt % to about 15 wt %. The detailing agent can include from about 70 wt % to about 90 wt % water, food grade propylene glycol in an amount from about 10 wt % to about 25 wt %, and a food contact compliant chelating compound in an amount of from about 0.01 wt % to about 1 wt %.

16 Claims, 4 Drawing Sheets

(51) Int. Cl.
| | | |
|---|---|---|
| B29K 71/00 | (2006.01) | |
| B33Y 30/00 | (2015.01) | |
| B33Y 70/00 | (2020.01) | |
| C08K 3/04 | (2006.01) | |
| C08K 5/13 | (2006.01) | |
| C08K 5/17 | (2006.01) | |
| C08K 5/42 | (2006.01) | |
| C09D 7/20 | (2018.01) | |
| C09D 7/45 | (2018.01) | |
| C09D 7/61 | (2018.01) | |
| C09D 7/63 | (2018.01) | |

(52) U.S. Cl.
CPC ............ C09D 7/61 (2018.01); C09D 7/63 (2018.01); *B29C 64/165* (2017.08); *B29K 2071/02* (2013.01); *B33Y 30/00* (2014.12); *C08K 3/04* (2013.01); *C08K 5/13* (2013.01); *C08K 5/175* (2013.01); *C08K 5/42* (2013.01)

(56) References Cited

U.S. PATENT DOCUMENTS

| | | |
|---|---|---|
| 9,133,344 B2 | 9/2015 | Ganapathiappan et al. |
| 9,856,390 B2 | 1/2018 | Bredt et al. |
| 2002/0119236 A1 | 8/2002 | Yokoo et al. |
| 2005/0101684 A1 | 5/2005 | You et al. |
| 2006/0012051 A1* | 1/2006 | Sato ............ C08F 297/02 257/777 |
| 2011/0177138 A1 | 7/2011 | Herry et al. |
| 2013/0035456 A1 | 2/2013 | Zhu et al. |
| 2016/0160021 A1 | 6/2016 | Kojima et al. |
| 2017/0106591 A1* | 4/2017 | Tabayashi ............ B33Y 10/00 |
| 2017/0145155 A1 | 5/2017 | Wright et al. |
| 2017/0246807 A1 | 8/2017 | Emamjomeh et al. |
| 2017/0247552 A1* | 8/2017 | Prasad ............ B41M 5/0023 |
| 2018/0015665 A1 | 1/2018 | Kosugi et al. |
| 2018/0192686 A1* | 7/2018 | Shoseyov ............ A21C 11/163 |
| 2018/0264753 A1 | 9/2018 | Kornilovich et al. |
| 2018/0333914 A1 | 11/2018 | Rudisill et al. |
| 2019/0030799 A1 | 1/2019 | Chen et al. |
| 2019/0039296 A1* | 2/2019 | Prasad ............ C09C 1/48 |
| 2019/0047216 A1 | 2/2019 | Emamjomeh et al. |
| 2019/0091400 A1 | 3/2019 | Everhart |
| 2019/0105842 A1 | 4/2019 | Dau et al. |
| 2019/0328988 A1 | 10/2019 | Weiss et al. |
| 2019/0343769 A1* | 11/2019 | Kasperchik ............ A61K 9/2095 |
| 2020/0115574 A1* | 4/2020 | Querol Esparch ...... C08L 23/12 |
| 2021/0214570 A1* | 7/2021 | Prasad ............ C09D 11/54 |
| 2023/0203337 A1 | 6/2023 | Discekici et al. |

FOREIGN PATENT DOCUMENTS

| | | | |
|---|---|---|---|
| WO | 2017/172937 A1 | 10/2017 | |
| WO | WO-2017188965 A1 * | 11/2017 | ............ B29C 64/165 |
| WO | WO-2017188966 A1 * | 11/2017 | ............ B29C 64/165 |
| WO | 2018/222108 A1 | 12/2018 | |
| WO | 2019/172937 A1 | 9/2019 | |
| WO | WO-2019182579 A1 * | 9/2019 | ............ B33Y 70/00 |
| WO | 2019/199328 A1 | 10/2019 | |
| WO | 2019/245535 A1 | 12/2019 | |
| WO | 2020/081094 A1 | 4/2020 | |

* cited by examiner

THREE-DIMENSIONAL PRINTING WITH FOOD CONTACT COMPLIANT AGENTS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. In some respects, three-dimensional printing has been somewhat limited with respect to commercial production capabilities because the range of materials used in three-dimensional printing is likewise limited. Nevertheless, several commercial sectors such as aviation and the medical industry have benefited from the ability to rapidly prototype and customize parts for customers.

Figure 1:
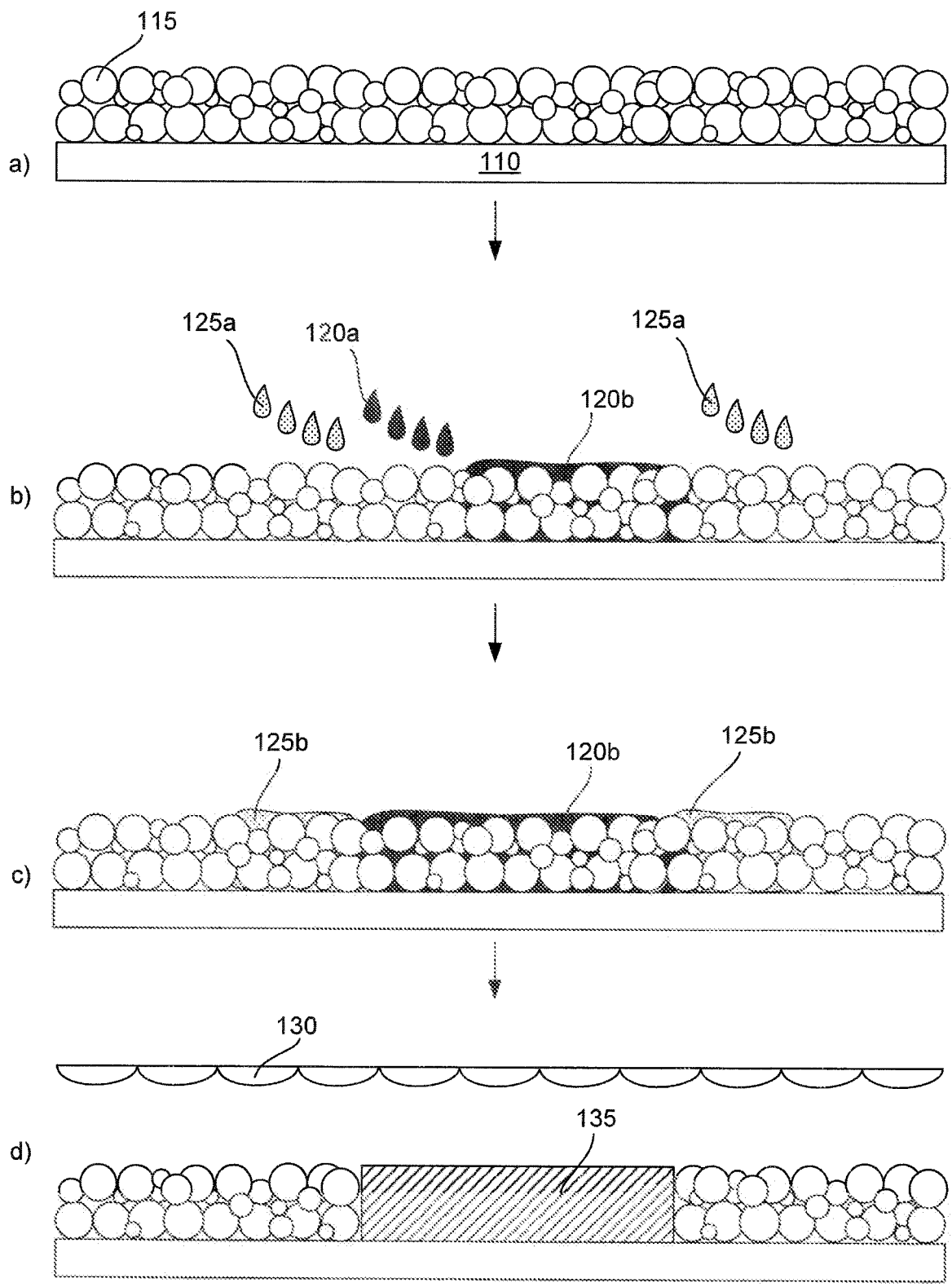
FIG. 1 is a close-up side cross-sectional view of a layer of thermoplastic polymer powder, a fusing agent, and a detailing agent in accordance with examples of the present disclosure.

The figures depict examples of the presently disclosed technology. However, it should be understood that the present technology is not limited to the examples depicted.

DETAILED DESCRIPTION

The present disclosure describes food contact compliant materials for three-dimensional printing. In one example, a multi-fluid kit of food contact compliant agents for three-dimensional printing includes a food contact compliant fusing agent and a food contact compliant detailing agent. The food contact compliant fusing agent includes: from about 70 wt % to about 96 wt % water based on the total weight of the food contact compliant fusing agent, food contact compliant carbon black dispersion in an amount of from about 3 wt % to about 10 wt % by solids weight of the carbon black dispersion out of the total weight of the food contact compliant fusing agent, and food grade propylene glycol in an amount of from about 1 wt % to about 15 wt % based on the total weight of the food contact compliant fusing agent. The food contact compliant detailing agent includes from about 70 wt % to about 90 wt % water based on the total weight of the food contact compliant detailing agent, food grade propylene glycol in an amount from about 10 wt % to about 25 wt % based on the total weight of the food contact compliant detailing agent, and a food contact compliant chelating compound in an amount of from about 0.01 wt % to about 1 wt % based on the total weight of the food contact compliant detailing agent. In some examples, the food contact compliant fusing agent can be devoid of glycerol or can include food grade glycerol in an amount from about 0.1 wt % to about 6 wt % based on the total weight of the food contact compliant fusing agent. In further examples, the food contact compliant detailing agent can also include food grade glycerol in an amount from about 1 wt % to about 6 wt % based on the total weight of the food contact compliant detailing agent. In still further examples, the food contact compliant fusing agent can also include polyethylene glycol in an amount from about 1 wt % to about 10 wt % based on the total weight of the food contact compliant fusing agent. In some examples, the food contact compliant fusing agent and the food contact compliant detailing agent can include 2-phenoxyethanol in an amount from about 0.2 wt % to about 1 wt % based on the total weight of the respective agents. In certain examples, the food contact compliant detailing agent can include from about 70 wt % to about 75 wt % water based on the total weight of the food contact compliant detailing agent. In further examples, the food contact compliant chelating compound can be disodium ethylenediaminetetraacetate dihydrate.

The present disclosure also describes three-dimensional printing kits. In one example, a three-dimensional printing kit includes a food contact compliant fusing agent, a food contact compliant detailing agent, and a thermoplastic polymer powder. The food contact compliant fusing agent includes: from about 70 wt % to about 96 wt % water based on the total weight of the food contact compliant fusing agent, food contact compliant carbon black dispersion in an amount of from about 3 wt % to about 10 wt % by solids weight of the carbon black dispersion out of the total weight of the food contact compliant fusing agent, and food grade propylene glycol in an amount of from about 1 wt % to about 15 wt % based on the total weight of the food contact compliant fusing agent. The food contact compliant detailing agent includes: from about 70 wt % to about 90 wt % water based on the total weight of the food contact compliant detailing agent, food grade propylene glycol in an amount from about 10 wt % to about 25 wt % based on the total weight of the food contact compliant detailing agent, and a food contact compliant chelating compound in an amount of from about 0.01 wt % to about 1 wt % based on the total weight of the food contact compliant detailing agent. In some examples, the thermoplastic polymer powder can include polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder. polypropylene powder, polyester powder, polycarbonate powder, polyether ketone powder, polyacrylate powder, polystyrene powder, polyvinylidene fluoride powder, or a combination thereof. In further examples, the thermoplastic polymer powder can have an average particle size from about 10 microns to about 200 microns. In other examples, the food contact compliant fusing agent can be devoid of glycerol or can include food grade glycerol in an amount from about 0.1 wt % to about 6 wt % based on the total weight of the food contact compliant fusing agent, and the food contact compliant detailing agent can also include food grade glycerol in an amount from about 1 wt % to about 6 wt % based on the total weight of the food contact compliant detailing agent. In still further examples, the food contact compliant fusing agent can also include polyethylene glycol in an amount from about 1 wt % to about 10 wt % based on the total weight of the food contact compliant fusing agent.

The present disclosure also describes three-dimensional printing systems. In one example, a three-dimensional printing system includes a powder bed including a thermoplastic polymer powder, a fluid jet printer, and a fusing radiation source. The fluid jet printer includes a first fluid ejector in communication with a reservoir of a food contact compliant fusing agent to print the food contact compliant fusing agent onto the powder bed. The food contact compliant fusing agent includes: about 70 wt % to about 96 wt % water based on the total weight of the food contact compliant fusing agent, food contact compliant carbon black dispersion in an amount of from about 3 wt % to about 10 wt % based on the total weight of the food contact compliant fusing agent, and food grade propylene glycol in an amount of from about 1 wt % to about 15 wt % based on the total weight of the food contact compliant fusing agent. The fluid jet printer also includes a second fluid ejector in communication with a reservoir of a food contact compliant detailing agent to print the food contact compliant detailing agent onto the powder bed. The food contact compliant detailing agent includes: from about 70 wt % to about 90 wt % water based on the total weight of the food contact compliant detailing agent, food grade propylene glycol in an amount from about 10 wt % to about 25 wt % based on the total weight of the food contact compliant detailing agent, and a food contact compliant chelating compound in an amount of from about 0.01 wt % to about 1 wt % based on the total weight of the food contact compliant detailing agent. The fusing radiation source is to expose the powder bed to electromagnetic radiation sufficient to fuse thermoplastic polymer powder that has been printed with the food contact compliant fusing agent. In certain examples, the food contact compliant fusing agent also includes dioctyl sulfosuccinate sodium salt and the food contact compliant fusing agent does not include sodium dodecyl sulfate. In further examples, the food contact compliant fusing agent can be devoid of glycerol or can include food grade glycerol in an amount from about 0.1 wt % to about 6 wt % based on the total weight of the food contact compliant fusing agent, and the food contact compliant detailing agent can also include food grade glycerol in an amount from about 1 wt % to about 6 wt % based on the total weight of the food contact compliant detailing agent.

The multi-fluid kits, three-dimensional printing kits, and systems described herein can be used to print three-dimensional objects that can be sold in regulated markets such as the food contact compliant market. In an example of a three-dimensional printing process that can be performed with these materials, a thin layer of thermoplastic polymer powder is spread on a bed to form a powder bed. A printing head, such as a fluid jet print head, is then used to print a fusing agent and/or detailing agent over portions of the powder bed. The bed is exposed to a light source, e.g., typically the entire bed. The fusing agent absorbs more energy from the light than the unprinted powder. The absorbed light energy is converted to thermal energy, causing the printed portions of the powder to melt and coalesce. This forms a solid layer. After the first layer is formed, a new thin layer of polymer powder is spread over the powder bed and the process is repeated to form additional layers until a complete three-dimensional part is printed. Such three-dimensional printing processes can achieve fast throughput with good accuracy.

In some examples of the presently disclosed technology, the food contact compliant fusing agent and the food contact compliant detailing agent can be jettable, that is, formulated for use in a fluid jet printer such as a thermal inkjet printer. Fluid jet printing technology can be used to print food contact compliant fusing agent and/or food contact compliant detailing agent onto the powder bed with high speed and high resolution. The food contact compliant fusing agent and the food contact compliant detailing agent can be formulated to have suitable printing reliability, which can be related to the viscosity of the fusing agent and the detailing agent. In further examples, the food contact compliant fusing agent and the food contact compliant detailing agent can be formulated to provide a long resistor life for the resistors in a thermal fluid jet printing system. Accordingly, the materials described herein can, in some examples, be used to make food contact compliant three-dimensional printed objects and the fluid agents can be jettable without deleterious effects on nozzle health or shelf-life stability of the fluid agents.

Another useful feature of the food contact compliant fusing agents and detailing agents described herein is low degradation of the polymer powder when the agents are applied onto the powder, even when the powder is heated to a high temperature. Depending on the specific formulation used, some other fusing agents and detailing agents can cause increased degradation of the polymer powder build material. In the case of fusing agents, the polymer powder having fusing agent applied thereon fuses together to become a part of the final three-dimensional printed object. If the fusing agent causes degradation of the polymer, then the properties of the three-dimensional printed object can be compromised. In the case of detailing agents, the detailing agent can be applied to portions of the powder bed around the edges of the areas that are to be fused together. The detailing agent can help prevent surrounding polymer powder from fusing together. In many cases it is desired to recycle the loose polymer powder that is left over after printing an object. However, when the detailing agent causes degradation of the polymer powder, the powder can be less suitable for recycling. However, the fusing agent formulations and the detailing agent formulations described herein have been found to cause little to no degradation of the polymer powder. Therefore, these agents can provide better properties in three-dimensional printed objects and better recyclability of the polymer powder compared to other fusing agents and detailing agents.

In some examples, degradation of the polymer build material can be detected as visible browning or yellowing of the polymer. As used herein, "browning" and "yellowing" refer to the same color change of the polymer, where a darker brown color corresponds to more severe degradation of the polymer. In many cases, some browning can occur when polymer powder is heated to a high temperature, even when no fluid agents have been applied to the powder. However, some types of fusing agents and detailing agents have been found to accelerate the browning process so that the polymer powder has a darker color after application of the agent and heating. As mentioned above, this can negatively affect other properties of the polymer besides the color. In contrast, the fusing agents and detailing agents described herein have been found to cause little or no additional browning. In particular, when the fusing agent or detailing agent is applied to polymer powder and then heated, the polymer powder shows comparable browning to when polymer powder is heated without any fluid agents applied. Thus, although some browning may occur, the browning is not accelerated by the fusing agent or detailing agent.

Degradation of the polymer powder can also be detected by measuring the solution viscosity of the polymer. Some fusing agents and detailing agents that degrade the polymer can result in a reduction in the solution viscosity of the polymer. This reduction in solution viscosity indicates degradation of polymer chains in the polymer powder. The reduction in solution viscosity can occur when polymer powder is treated with the fusing agent or detailing agent and then aged by heating at a high temperature for a period of time. However, the particular fusing agent and detailing agent formulations described herein have been found to provide comparable solution viscosity to aged polymer powder without any fluid agents applied. Thus, the fusing agents and detailing agents described herein do not cause the same reduction in solution viscosity that some other fluid agents can cause. Solution viscosity can be measured by combining about 0.5 wt % of the polymer with about 99.5 wt % M-cresol and measuring the viscosity of the admixture. Further details for determining solution viscosity under this measurement protocol are described in International Standard ISO 307, Fifth Edition, 2007-05-15.

As mentioned above, the multi-fluid kits, three-dimensional printing kits, and systems described herein can include a food contact compliant fusing agent. In some examples, the food contact compliant fusing agent can include from about 70 wt % to about 96 wt % water, a food contact compliant carbon black dispersion in an amount of from about 3 wt % to about 10 wt % by solids weight of the carbon black dispersion out of the total weight of the food contact compliant fusing agent, and food grade propylene glycol in an amount from about 1 wt % to about 15 wt % based on the total weight of the food contact compliant fusing agent. Specific examples of these ingredients are described in more detail below. In further examples, the food contact compliant fusing agent can also include additional ingredients. Some such additional ingredients can include an additional food contact compliant co-solvent, a food contact compliant pH adjuster, a food contact compliant liquid additive, and a food contact compliant surfactant.

In some examples, the food contact compliant pH adjuster can include taurine, glycine, sodium bicarbonate, sodium dihydrogen orthophosphate, mono-sodium phosphate, di-sodium phosphate, tribasic-sodium phosphate, or mixtures thereof. In certain examples, the food contact compliant fusing agent can include taurine as a pH adjuster. In alternative examples, the food contact compliant fusing agent can be devoid of pH adjusters. In particular examples, the food contact compliant fusing agent can be devoid of any of the example pH adjusters described above. In another particular example, the food contact compliant fusing agent can be devoid of taurine.

In some examples, the food contact compliant liquid additive is 2-phenoxyethanol, 2-phenylethanol, potassium sorbate, sodium benzoate, methylparaben, propylparaben, or mixtures thereof. In certain examples, the food contact compliant fusing agent can include 2-phenoxyethanol as a liquid additive. In a specific example, the food contact compliant fusing agent can include a food contact compliant liquid additive in an amount from about 0.2 wt % to about 2 wt %. In other examples, the food contact compliant fusing agent can include the food contact compliant liquid additive in an amount from about 0.8 wt % to about 1.5 wt %. In various examples, the liquid additive may not be a "liquid" on its own, but can be an additive that is included in the liquid agents described herein. For example, the liquid additive can include a solid that is soluble in the food contact compliant fusing agent.

The food contact compliant surfactant included in the food contact compliant fusing agent can include sodium dodecyl sulfate, dioctyl sulfosuccinate sodium salt, polyoxyethylene sorbitan monolaurate, isothionic acid sodium salt, sodium cocoyl isethionate, silicone surfactants, non-ionic surfactants, anionic surfactants, cationic surfactants, or combinations thereof. In some examples, a food contact compliant surfactant can be included in the food contact compliant fusing agent in an amount of from about 0.05 wt % to about 0.5 wt %. In further examples, the surfactant can be included in an amount of from about 0.1 wt % to about 0.2 wt %. In a particular example, the food contact compliant surfactant can include dioctyl sulfosuccinate sodium salt. In a further example, the food contact compliant fusing agent can be devoid of sodium dodecyl sulfate.

A food contact compliant detailing agent can also be included in the multi-fluid kits and three-dimensional printing kits described herein. In some examples, a food contact compliant detailing agent can include: from about 70 wt % to about 90 wt % water, a food contact compliant chelating compound in an amount of from about 0.01 wt % to about 1 wt % based on the total weight of the food contact compliant detailing agent, and food grade propylene glycol in an amount from about 10 wt % to about 25 wt %. The detailing agent can also include additional ingredients, such as a food contact compliant pH adjuster, a food contact compliant co-solvent, a food contact compliant liquid additive, and a food contact compliant surfactant.

In some examples, the food contact compliant pH adjuster included in the food contact compliant detailing agent can include taurine, glycine, sodium bicarbonate, sodium dihydrogen orthophosphate, mono-sodium phosphate, di-sodium phosphate, tribasic-sodium phosphate, or mixtures thereof. In certain examples, the food contact compliant detailing agent can include sodium bicarbonate as a pH adjuster. In further examples, the food contact compliant detailing agent can include a pH adjuster in an amount of from about 0.01 wt % to about 1 wt % with respect to the total weight of the food contact compliant detailing agent.

In some examples, the food contact compliant liquid additive included in the food contact compliant detailing agent can include 2-phenoxyethanol, 2-phenylethanol, potassium sorbate, sodium benzoate, methylparaben, propylparaben, or mixtures thereof. In certain examples, the food contact compliant detailing agent can include 2-phenoxyethanol as a liquid additive. In a specific example, the food contact compliant detailing agent can include a food contact compliant liquid additive in an amount from about 0.2 wt % to about 2 wt %. In other examples, the food contact compliant detailing agent can include the food contact compliant liquid additive in an amount from about 0.8 wt % to about 1.5 wt %.

The food contact compliant surfactant included in the food contact compliant detailing agent can include sodium dodecyl sulfate, dioctyl sulfosuccinate sodium salt, polyoxyethylene sorbitan monolaurate, isothionic acid sodium salt, sodium cocoyl isethionate, silicone surfactants, non-ionic surfactants, anionic surfactants, cationic surfactants, or combinations thereof. In some examples, a food contact compliant surfactant can be included in the food contact compliant detailing agent in an amount of from about 0.05 wt % to about 0.5 wt %. In further examples, the surfactant can be included in an amount of from about 0.1 wt % to about 0.2 wt %. In a particular example, the food contact compliant surfactant can include dioctyl sulfosuccinate sodium salt.

The food contact compliant detailing agent can also include a food contact compliant chelating compound. In some examples, the food contact compliant chelating compound can include disodium ethylenediaminetetraacetate dihydrate, tetrasodium ethylenediaminetetraacetate salt, calcium disodium ethylenediaminetetraacetate, free acid ethylenediaminetetraacetic acid, citric acid, sodium citrate, potassium citrate, polyphosphates such as disodiumpyrophosphate, or a combination thereof. In a particular example, the food contact compliant chelating compound can be disodium ethylenediaminetetraacetate dihydrate. In further examples, the food contact compliant detailing agent can include the food contact compliant chelating compound in an amount from about 0.01 wt % to about 1 wt %.

In some examples, the food contact compliant fusing agent and the food contact compliant detailing agent described herein can be jetted onto a bed of thermoplastic polymer powder. In certain examples, the thermoplastic polymer powder can include polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder, polypropylene powder, polyester powder, polycarbonate powder, polyether ketone powder, polyacrylate powder, polystyrene powder, polyvinylidene fluoride powder, or a combination thereof.

The food contact compliant fusing agent and the detailing agent described above can also be included in a three-dimensional printing kit. In some examples, the three-dimensional printing kit can include a food contact compliant fusing agent, a food contact compliant detailing agent, and a thermoplastic polymer powder. The food contact compliant fusing agent can include: from about 70 wt % to about 96 wt % water based on the total weight of the food contact compliant fusing agent, food contact compliant carbon black dispersion in an amount of from about 3 wt % to about 10 wt % by solids weight of the carbon black dispersion out of the total weight of the food contact compliant fusing agent, and food grade propylene glycol in an amount of from about 1 wt % to about 15 wt % based on the total weight of the food contact compliant fusing agent. The food contact compliant detailing agent can include: from about 70 wt % to about 90 wt % water based on the total weight of the food contact compliant detailing agent, a food contact compliant chelating compound in an amount of from about 0.01 wt % to about 1 wt % based on the total weight of the food contact compliant detailing agent, and food grade propylene glycol in an amount from about 10 wt % to about 25 wt % based on the total weight of the food contact compliant detailing agent.

In some examples, the thermoplastic polymer powder used in the three-dimensional printing kits can include polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder, polypropylene powder, polyester powder, polycarbonate powder, polyether ketone powder, polyacrylate powder, polystyrene powder, polyvinylidene fluoride powder, or a combination thereof. In some examples, the thermoplastic polymer powder can have an average particle size from about 10 microns to about 200 microns.

The present disclosure also describes three-dimensional printing systems. The systems can include a powder bed that includes the thermoplastic polymer powder described above. The system can also include a fluid jet printer that includes a first fluid ejector in communication with a reservoir of a food contact compliant fusing agent as described above. The fluid jet printer can also include a second fluid ejector in communication with a reservoir of a food contact compliant detailing agent as described above. The system can also include a fusing radiation source to expose the powder bed to electromagnetic radiation sufficient to fuse thermoplastic polymer powder that has been printed with the food contact compliant fusing agent.

Food Contact Compliant Fusing Agent Examples

In addition to properties of the fusing agent that allow the fusing agent to be printed using fluid jet technology, the fusing agent can also be formulated to (i) be food contact compliant and (ii) provide good fusing of the thermoplastic polymer powder in the three-dimensional printing process described above. Thus, the fusing agent can include a food contact compliant energy absorber to absorb electromagnetic energy to generate sufficient heat to fuse the thermoplastic polymer powder. In some examples, the energy absorber can include a food contact compliant carbon-based pigment, such as a food contact compliant carbon black pigment. Food contact compliant carbon black pigments can effectively absorb electromagnetic radiation across a wide range of wavelengths while still usable for regulated applications such as food contact compliant materials (e.g., food packaging), cosmetic contact materials (e.g., cosmetic packaging or products such as mascara wands), and other regulated consumer applications. Therefore, food contact compliant carbon black pigments can effectively raise the temperature of the thermoplastic polymer powder onto which they may be printed.

Balancing all of the above properties to produce a food contact compliant fusing agent with good jetting properties as well as good fusing properties can be challenging. However, certain formulations can provide food contact compliant fusing agents that function well as food contact compliant fusing agents in the three-dimensional printing processes described herein, while also providing good jetting properties.

With this description in mind, some examples of the presently disclosed technology involve three-dimensional printing kits, multi-fluid kits, and/or compositions including a food contact compliant fusing agent and/or a food contact compliant detailing agent. The food contact compliant fusing agent and food contact compliant detailing agent can be formulated for fluid jet printing. In additional examples, the presently disclosed technology can encompass kits made up of a food contact compliant fusing agent and a food contact compliant detailing agent in combination with a thermoplastic polymer powder. As explained above, the food contact compliant fusing agent can be printed onto portions of a thermoplastic polymer powder bed and the bed can be irradiated with electromagnetic radiation to fuse the printed portions. This forms a single layer of the three-dimensional part being printed. The food contact compliant detailing agent can be printed in areas at or near the edges of the portions that may be printed with the fusing agent. The food contact compliant detailing agent can have the effect of cooling the polymer powder around the edges of the portions printed with the food contact compliant fusing agent. Thus, when the portions printed with the food contact compliant fusing agent are fused by irradiation with electromagnetic energy, the polymer powder around the edges can remain at a lower temperature. This can prevent fusing of the polymer powder surrounding the edges of the fused layer, increasing selectivity between the fused portions and the unfused portions of the powder bed.

Three-Dimensional Printing Kit Examples and Three-Dimensional Printing Method Examples Examples of the kits and compositions described above are shown in more detail in FIG. 1. With specific reference to FIG. 1, a) shows a build platform or movable floor 110 of a three-dimensional printing system, to which is deposited a thin layer of thermoplastic polymer powder 115 to form a powder bed. Next, b) shows droplets of a fusing agent 120a as well as already deposited food contact compliant fusing agent 120b applied to and within a portion of the powder bed. Droplets of a food contact compliant detailing agent 125a may be applied to portions of the powder bed adjacent to the edges of the portion printed with the food contact compliant fusing agent. The food contact compliant fusing agent 120b and food contact compliant detailing agent 125b applied to the powder bed admix and fill voids within the powder, as shown in c). The portion of the powder bed printed with the food contact compliant fusing agent is then fused using a curing lamp 130 to form a fused part layer 135. In some cases the food contact compliant detailing agent can substantially evaporate off of the powder bed, leaving unfused thermoplastic polymer powder around the edge of the fused part layer. The build platform or moveable floor can then be lowered and the process can be repeated with additional layers of thermoplastic polymer powder to form additional fused layers of the three-dimensional printed part.

It should be noted that the fused part layer 135 shown in FIG. 1 is an idealized depiction of the fused layers formed in practice. In some cases, fused layers formed using the processes described herein do not have a perfect rectangular cross section as shown in FIG. 1, because edges of the fused layers can often include partially fused polymer particles embedded into the fused layers. This can result in a surface that is uneven or bumpy at the scale of the individual particles. However, in some examples the thermoplastic polymer powder particles can be small enough that the parts printed therefrom still have a smooth appearance when viewed by the human eye.

In a particular example of the presently described technology, a kit or composition can include a food contact compliant fusing agent and a food contact compliant detailing agent. The food contact compliant fusing agent can include water, a food contact compliant carbon black pigment, and food grade propylene glycol in an amount from about 1 wt % to about 15 wt % as described above. In some examples, the food contact compliant detailing agent can include water, food grade propylene glycol, and a food contact compliant chelating compound.

Food Contact Compliant Carbon Black Dispersion Examples

In some examples, the food contact compliant carbon black pigment can be in the form of a dispersion of food contact compliant carbon black pigment particles. The dispersion stability and particle size of the carbon black pigment dispersion can affect the jettability of the fusing agent. As used herein, "dispersion stability" refers to the ability of the food contact compliant carbon black pigment particles to remain dispersed without aggregating to form large aggregate particles that interfere with jetting. Dispersion stability can be measured in various ways. In one example, dispersion stability can be stated as a measurement of average pigment particle size over time. Food contact compliant pigments with a high dispersion stability can have an average particle size that remains stable overtime, while food contact compliant pigments with a low dispersion stability can show increased particle size over time. In another example, dispersion stability can be measured by counting the number of particles with a particle size over a certain threshold particle size for a period of time. Food contact compliant pigments with low dispersion stability will show an increase in the number of large particles over time. When food contact compliant pigment particles aggregate to form larger aggregate particles, the viscosity of the fusing agent can also increase. Therefore, the dispersion stability can also be measured by measuring viscosity of the food contact compliant fusing agent over time.

In some examples, the carbon black dispersion can have a composition as shown in Table 1 below.

TABLE 1

| Component | wt % |
| --- | --- |
| Carbon black | 10-20 |
| Organic solvent | 15-20 |
| Binder Resin | 3-10 |
| Water | balance |

In certain examples, the food contact compliant carbon black pigment can have an average primary particle size from 2 nm to 50 nm. Additionally, the food contact compliant carbon black pigment can have an average aggregate particle size from 60 nm to 200 nm.

In further examples, the food contact compliant carbon black pigment can be dispersed by a dispersant. In certain examples, the dispersant can include a polymeric dispersant. Non-limiting examples of polymeric dispersants can include styrenes, maleic anhydrides, acrylics, or copolymers thereof. In particular examples, the dispersant can include a styrene acrylic copolymer such as JONCRYL® styrene acrylic resins available from BASF (Germany). Small molecule dispersing agents can also be used. In further examples, the carbon black pigment can be in the form of a pigment dispersion such as a CAB-O-JET® carbon black pigment dispersion available from Cabot (USA).

In some examples, the food contact compliant carbon black dispersion includes from about 10 wt % to about 20 wt % food contact compliant carbon black particles based on the total weight of the carbon black dispersion, or the food contact compliant carbon black dispersion includes from about 12 wt % to about 18 wt % food contact compliant carbon black particles based on the total weight of the carbon black dispersion, or the food contact compliant carbon black dispersion includes from about 14 wt % to about 16 wt % food contact compliant carbon black particles based on the total weight of the carbon black dispersion. In some examples, the food contact compliant carbon black dispersion is present in an amount of from about 4 wt % to about 7 wt % based on the total weight of the food contact compliant fusing agent, or the food contact compliant carbon black dispersion is present in an amount of from about 5 wt % to about 6 wt % based on the total weight of the food contact compliant fusing agent.

In some examples, the food contact compliant polymeric dispersant is used in an amount of from about 0.5 wt % to about 5 wt % based on the total weight of the food contact compliant fusing agent and/or food contact compliant detailing agent.

As mentioned above, in some examples the food contact compliant carbon black dispersion can include an organic compliant solvent. In some cases, this solvent can be a kneading solvent. In a certain example, the organic solvent can include food grade glycerol.

Food Contact Energy Absorber Examples/Dye Examples/Pigment Examples

In some examples, the food contact compliant carbon black dispersion is present in an amount of from about 3 wt % to about 10 wt % based on the total weight of the fusing agent. In some examples, the food contact compliant carbon black dispersion is present in an amount of from about 4 wt % to about 7 wt % based on the total weight of the fusing agent.

In some examples, the food contact compliant carbon black dispersion includes from about 10 wt % to about 20 wt % carbon black particles based on the total weight of the carbon black dispersion. In some examples, the food contact compliant carbon black dispersion includes from about 12 wt % to about 18 wt % carbon black particles based on the total weight of the carbon black dispersion. In some examples, the food contact compliant carbon black dispersion includes from about 14 wt % to about 16 wt % carbon black particles based on the total weight of the carbon black dispersion.

In further examples, the food contact compliant fusing agent can include additional energy absorbers. Similar to the food contact compliant carbon black pigment, these additional energy absorbers can also effectively absorb electromagnetic radiation to produce heat. Examples of other food contact compliant energy absorbers can include food contact compliant near-infrared absorbing dyes, food contact compliant near-infrared absorbing pigments, food contact compliant metal nanoparticles, food contact compliant conjugated polymers, or combinations thereof.

As mentioned, the food contact compliant energy absorbers can also include a conjugated polymer. As used herein, "conjugated" refers to alternating double and single bonds between atoms in a molecule. Thus, "conjugated polymer" refers to a polymer that has a backbone with alternating double and single bonds. In many cases, the food contact compliant energy absorbers can have a peak absorption wavelength in the range of 800 nm to 1400 nm.

In some examples, the food contact compliant carbon black pigment and additional food contact compliant energy absorbers, if present, can be water-dispersible or water-soluble. Such food contact compliant energy absorbers can be used with an aqueous food contact compliant vehicle with or without a food contact compliant co-solvent.

Food Contact Compliant Co-Solvent(s) Examples

The components of the food contact compliant fusing agent can be selected to give the food contact compliant fusing agent good fluid jetting performance and the ability to fuse the polymer bed material and/or color the polymer powder with good optical density. Thus, the food contact compliant fusing agent can include a food contact compliant liquid vehicle. In some examples, the food contact compliant liquid vehicle formulation can include a food contact compliant co-solvent present in an amount of from about 1 wt % to about 25 wt %, depending on the jetting architecture. As mentioned above, in some examples the fusing agent can specifically include from about 1 wt % to about 15 wt % of food grade propylene glycol, which is one example of a food contact compliant co-solvent. In certain examples, the fusing agent can include an additional co-solvent or co-solvents besides the food grade propylene glycol. The total amount of co-solvent can be from about 1 wt % to about 25 wt %.

Regarding the detailing agent, the amount of propylene glycol in the detailing agent can be higher than the amount in the fusing agent, in some examples. For example, the detailing agent can include from about 10 wt % to 25 wt % food grade propylene glycol. The detailing agent can also include additional co-solvents. In various examples, the total amount of co-solvent in the detailing agent can be from about 10 wt % to about 30 wt %.

Glycerol is another example of a food contact compliant co-solvent. However, it has been found that high concentrations of glycerol in the fusing agent (or detailing agent) may cause increased degradation of polymer powder on which the agent is applied. Therefore, in some examples the fusing agent can be devoid of glycerol or can include glycerol in a relatively small amount, such as from about 0.1 wt % to about 6 wt %. In some examples, the food contact compliant carbon black dispersion may include glycerol as a kneading solvent. Thus, the glycerol from the carbon black dispersion may be incorporated into the fusing agent. However, the total amount of glycerol in the fusing agent can be from about 0.1 wt % to about 6 wt %. In certain examples, the fusing agent can be devoid of any additional glycerol, besides the glycerol that may be present in the carbon black dispersion. Regarding the detailing agent, the amount of glycerol in the detailing agent can also be relatively small. In some examples, the detailing agent can be devoid of glycerol. In other examples, the detailing agent can include glycerol in an amount from about 1 wt % to about 6 wt %.

In certain examples, a food contact compliant high boiling point co-solvent can be included in the various fluids. The food contact compliant high boiling point co-solvent can be an organic co-solvent that boils at a temperature higher than the temperature of the powder bed during printing. In some examples, the food contact compliant high boiling point co-solvent can have a boiling point above 250° C. In still further examples, the food contact compliant high boiling point co-solvent can be present in the various fluids at a concentration from about 1 wt % to about 4 wt %.

Classes of food contact compliant co-solvents that can be used can include food contact compliant organic co-solvents including aliphatic alcohols, diols, glycol ethers, polyglycol ethers, caprolactams, and long chain alcohols.

Examples of such compounds include food contact compliant primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, and the like. Specific examples of food contact compliant solvents that can be used include, but are not limited to food contact compliant propylene glycol, food contact compliant glycerol, food contact compliant polyethylene glycol, or combinations thereof.

In a particular example, the food contact compliant fusing agent can include propylene glycol, glycerol, polyethylene glycol, or combinations thereof, as co-solvents. In some examples, the food contact compliant co-solvent in the food contact compliant fusing agent can include food contact compliant propylene glycol, food contact compliant glycerol, food contact compliant polyethylene glycol, or combinations thereof, in an amount from about 1 wt % to about 25 wt % with respect to the total weight of the food contact compliant fusing agent, or in an amount from about 3 wt % to about 20 wt % with respect to the total weight of the food contact compliant fusing agent, or in an amount from about 5 wt % to about 15 wt % with respect to the total weight of the food contact compliant fusing agent, or in an amount from about 1 wt % to about 10 wt % with respect to the total weight of the food contact compliant fusing agent.

Food Contact Compliant Surfactant(s) Examples

Regarding the food contact compliant surfactant that may be present, a single surfactant or multiple surfactants can be used, such as sodium dodecyl sulfate, dioctyl sulfosuccinate sodium salt, and the like. In some examples, the food contact compliant surfactant is sodium dodecyl sulfate, dioctyl sulfosuccinate sodium salt, Tween 20 (or polyoxyethylene sorbitan monolaurate), isethionic acid sodium salt, sodium cocoyl isethionate, KOLLIPHOR® EL from BASF Corp. (Germany), or combinations thereof.

Although the food contact compliant surfactant used in the fluid agents described herein can include sodium dodecyl sulfate in some examples, in other examples the fluid agents can be devoid of sodium dodecyl sulfate. In particular, in some examples the food contact compliant fusing agent can be devoid of sodium dodecyl sulfate. This ingredient has been found, unexpectedly, to cause precipitation of solids in the fusing agent, which can interfere with the jettability of the fusing agent. In some examples, the food contact compliant fusing agent can include a carbon black dispersion, but can be devoid of sodium dodecyl sulfate so that this precipitation does not occur. In certain examples, the food contact compliant fusing agent can include dioctyl sulfosuccinate sodium salt exclusively as a surfactant.

In some examples, food contact compliant surfactants can include silicone surfactants. The food contact compliant silicone surfactants can include siloxanes and can be alkoxylated, polyester modified, polyether modified, polyether modified hydroxy functional, amine modified, epoxy modified and other modifications or combinations thereof. In some examples, the food contact compliant siloxanes are polymeric, for example polydimethylsiloxanes.

The amount of food contact compliant surfactant added to the food contact compliant fusing agent may range from about 0.01 wt % to about 10 wt %. In other examples, the amount of food contact compliant surfactant in the food contact compliant fusing agent can be from about 0.1 wt % to about 5 wt %, or the amount of food contact compliant surfactant in the food contact compliant fusing agent can be from about 0.5 wt % to about 4.5 wt %, or the amount of food contact compliant surfactant in the food contact compliant fusing agent can be from about 1 wt % to about 4 wt %, or the amount of food contact compliant surfactant in the food contact compliant fusing agent can be from about 1.5 wt % to about 3 wt %. In further examples, the amount of food contact compliant surfactant in the food contact compliant fusing agent can be from 0.05 wt % to 0.5 wt % or from 0.1 wt % to 0.2 wt %

Further, food contact compliant non-ionic, cationic, and/or anionic surfactants can be present in the food contact compliant fusing agent and/or the food contact compliant detailing agent, ranging from about 0.01 wt % to about 10 wt %.

In some examples, the food contact compliant liquid vehicle can also include food contact compliant dispersants in an amount of from about 0.1 wt % to about 10 wt %, or the food contact compliant liquid vehicle can also include food contact compliant dispersants in an amount of from about 1 wt % to about 8 wt %, or the food contact compliant liquid vehicle can also include food contact compliant dispersants in an amount of from about 2 wt % to about 6 wt %, or the food contact compliant liquid vehicle can also include food contact compliant dispersants in an amount of less than about 5 wt %.

The balance of the food contact compliant fusing agent formulation can be purified water, and/or other vehicle components such as food contact compliant biocides, food contact compliant viscosity modifiers, food contact compliant materials for pH adjustment, food contact compliant sequestering agents, food contact compliant preservatives, and the like. In one example, the food contact compliant liquid vehicle can be predominantly water, e.g., more than about 70 wt % water, or more than about 75 wt % water, or more than about 80 wt % water, or more than about 85 wt % water.

Food Contact Compliant DH Adjusters and Food Contact Compliant Liquid Additives

In some examples, the food contact compliant fusing agent and/or the food contact compliant detailing agent can include a food contact compliant pH adjuster and/or a food contact compliant liquid additive. However, in a particular example, the food contact compliant fusing agent can be devoid of pH adjusters. In another particular example, the food contact compliant detailing agent can include a basic pH adjuster.

In some examples, the food contact compliant pH adjuster can include taurine, glycine, sodium bicarbonate, sodium dihydrogen orthophosphate, mono-sodium phosphate, disodium phosphate, tribasic-sodium phosphate, or mixtures thereof. In some examples, the food contact compliant pH adjuster can be added to the food contact compliant fusing agent and/or detailing agent in an amount from about 0.01 wt % to about 3 wt % based on the total weight of the agent.

In some examples, the food contact compliant liquid additive can include 2-phenoxyethanol, 2-phenylethanol, potassium sorbate, sodium benzoate, methylparaben, propylparaben, or mixtures thereof. In some examples, the food contact compliant liquid additive can be added to the food contact compliant fusing agent and/or detailing agent in an amount of about 0.01 wt % to about 3 wt % based on the total weight of the agent. In certain examples, the food contact compliant fusing agent and the food contact compliant detailing agent can include 2-phenoxyethanol. In further examples, the 2-phenoxyethanol can be included in an amount from about 0.2 wt % to about 2 wt % or from about 0.8 wt % to about 1.5 wt %.

While the mechanism of action of the liquid additive in the food contact compliant fusing and/or detailing agents is unclear, it is believed that the liquid additive can have a stabilizing effect on the agent compositions.

Food Contact Compliant Other Additive(s) Examples

In some examples, various other food contact compliant additives can be employed to adjust certain properties of the fluid compositions for specific applications. Examples of these food contact compliant additives include those added to inhibit the growth of harmful microorganisms. These food contact compliant additives may be preservatives, biocides, fungicides, and other microbial agents, which can be used in various formulations.

The food contact compliant biocide can be present in the food contact compliant fusing agent in an amount of from about 0.01 wt % to about 1 wt %. In more specific examples, the food contact compliant biocide can be present in an amount of from about 0.1 wt % to about 0.5 wt %.

In some examples, food contact compliant sequestering agents, such as EDTA (ethylene diamine tetra acetic acid), may be included to eliminate the deleterious effects of any heavy metal impurities, and food contact compliant buffer solutions may be used to control the pH of the fluid. From about 0.01 wt % to about 2 wt % of sequestering agents and/or buffer solutions can be added.

In some examples, a food contact compliant chelating compound can also be included. In certain examples, the food contact compliant detailing agent can include a food contact compliant chelating compound. In a particular example, the food contact compliant chelating compound can be disodium ethylenediaminetetraacetate dihydrate. In some examples, a food contact compliant chelating compound can be included in an amount from about 0.01 wt % to about 1 wt %.

In some examples, food contact compliant viscosity modifiers may also be present, as well as other additives to modify properties of the fluid as desired. Such additives can be present in an amount of from about 0.01 wt % to about 10 wt %.

In some examples, food contact compliant anti-kogation compounds can be added to the food contact compliant fusing agent to reduce build-up of residues on the resistor element in a thermal fluid jet system used to print the food contact compliant fusing agent. In some examples, the food contact compliant anti-kogation compound can include phosphate esters, polyelectrolyte polymers, and inorganic phosphate buffers. Suitable food contact compliant anti-kogation compounds can also be added. Food contact compliant sequestering and/or chelating compounds can also be used for anti-kogation. In certain examples, the food contact compliant anti-kogation compounds can be included in the food contact compliant fusing agent in an amount from about 0.01 wt % to about 1 wt %. In other examples, the total amount of food contact compliant anti-kogation compounds in the food contact compliant fusing agent can be from about 0.2 wt % to about 0.6 wt % or from about 0.4 wt % to about 0.5 wt %.

In some examples, the food contact compliant fusing agent further includes a food contact compliant wetting compound and a food contact compliant surfactant. In some examples, the food contact compliant fusing agent further includes a food contact compliant dispersant.

In further examples, the food contact compliant fusing agent can be formulated for use at elevated temperatures, such as temperatures from 50° C. to 95° C. In other examples, the food contact compliant fusing agent can be formulated for use at temperatures from 70° C. to 85° C. Because the three-dimensional printing processes described herein can involve heating polymer powder to fuse the polymer powder, the food contact compliant fusing agent can often be exposed to elevated temperatures. In some cases, the food contact compliant fusing agent can be contained in a reservoir that is positioned near the powder bed. Thus, the food contact compliant fusing agent can be formulated to be stable and jettable within the above temperature ranges. Moreover, the food contact compliant fusing agent can be exposed to even higher temperatures after being printed onto the powder bed. The powder bed can often be preheated to a preheat temperature such as 140° C. to 160° C., and the temperature of the powder bed during fusing can reach temperatures even as high as 220° C. Therefore, the food contact compliant fusing agent can be formulated to be safe and effective when used at these high temperatures. In one example, the food contact compliant fusing agent can be substantially devoid of flammable co-solvents or other ingredients that would create a fire risk at the temperatures employed in the three-dimensional printing process. For example, the food contact compliant fusing agent can be devoid of co-solvents or other ingredients with an autoignition temperature below 220° C.

Food Contact Compliant Detailing Agent Examples

As mentioned above, the kits and compositions according to the presently disclosed technology can also include a food contact compliant detailing agent. The food contact compliant detailing agent can be formulated for use in the same systems as the food contact compliant fusing agent described above. For example, the food contact compliant detailing agent and the food contact compliant fusing agent can be formulated for printing from a fluid jet printhead. Thus, the food contact compliant detailing agent can include any of the various food contact compliant ingredients and food contact compliant additives described above with respect to the food contact compliant fusing agent. However, the food contact compliant detailing agent can be devoid of the carbon black pigment used as an energy absorber in the food contact compliant fusing agent.

In some examples, the food contact compliant detailing agent can be formulated to provide a cooling effect on portions of the thermoplastic polymer powder bed onto which the food contact compliant detailing agent is applied. This cooling effect can be achieved, for example, by evaporation of water and/or co-solvents in the food contact compliant detailing agent. While the food contact compliant fusing agent can also produce an initial cooling effect due to evaporation of water and co-solvents in the food contact compliant fusing agent, the food contact compliant fusing agent can produce a net heating effect due to the energy absorber present in the food contact compliant fusing agent. The food contact compliant detailing agent can be devoid of the energy absorber used in the food contact compliant fusing agent, and therefore the food contact compliant detailing agent can have a net cooling effect. When the food contact compliant detailing agent is printed onto the powder bed around the edges of the portion printed with the food contact compliant fusing agent, the respective cooling and heating effects of the food contact compliant detailing agent and the food contact compliant fusing agent, respectively, can produce a sharp boundary between the fused portion and the unfused portions of the powder bed. Without the food contact compliant detailing agent, in some cases thermal bleed from the fused portion can result in partial fusing of the thermoplastic polymer powder around the edges of the fused portion. This can result in caking of the particles around the finished three-dimensional printed part and low part quality.

As mentioned above, in some examples the food contact compliant detailing agent can be devoid of carbon black pigment and other energy absorbers. However, it should be noted that most if not all materials absorb some amount of electromagnetic energy and convert the energy to heat. Therefore, as used herein, "devoid of energy absorbers" does not imply that the detailing agent is devoid of any ingredients that can absorb electromagnetic energy in any amount. Rather, the food contact compliant detailing agent can be devoid of the specific energy absorbers disclosed as being included in the food contact compliant fusing agent for the purpose of absorbing electromagnetic energy.

The food contact compliant detailing agent can include food contact compliant co-solvents of the same types described above with respect to the food contact compliant fusing agent. In a particular example, the food contact compliant detailing agent can include propylene glycol, glycerol, polyethylene glycol, or combinations thereof, as co-solvents.

As mentioned above, in some examples the total amount of food contact compliant co-solvent in the detailing agent can be from about 10 wt % to about 30 wt %. Included in this amount, the detailing agent can include food grade propylene glycol in an amount from about 10 wt % to about 25 wt %. The detailing agent can also include an additional co-solvent or co-solvents. In certain examples, the detailing agent can also include glycerol in an amount from about 1 wt % to about 6 wt %.

Thermoplastic Polymer Powder(s) Examples

In some examples, the kits and compositions can include a thermoplastic polymer powder. The thermoplastic polymer powder can have an average particle size from 10 microns to 100 microns. As used herein, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles. In further detail, and in accordance with certain specific examples, the particle size distribution of the thermoplastic polymer powder can be as follows: D50 can be from 45 microns to 75 microns, from 55 microns to 65 microns, or about 60 µm; D10 can be from 10 microns to 50 microns, from 30 microns to 40 microns, or about 35 microns; and D90 can be from 75 microns to 150 microns, from 80 microns to 95 microns, or about 90 microns. "D50" is defined as the median weight. "D10" is defined as the tenth-percentile by weight of powder that is below a given particle size, e.g., from 20 microns to 50 microns. "D90" is defined as the ninetieth-percentile by weight of powder that is below a given particle size, e.g., 75 microns to 100 microns.

In certain examples, the thermoplastic polymer powder can have a variety of shapes, such as substantially spherical particles or irregularly-shaped particles. In a particular example, the thermoplastic polymer powder can have a sphericity of 0.7 or greater. As used herein, "sphericity" refers to a ratio of the surface area of a sphere having the same volume as a particle to the actual surface area of the particle. Additionally, in some examples the thermoplastic polymer powder can have a BET surface area of less than 15 m$^2$/g.

In some examples, the polymer powder can be capable of being formed into three-dimensional printed parts with a resolution of 10 to 200 microns. As used herein, "resolution" refers to the size of the smallest feature that can be formed on a three-dimensional printed part. The polymer powder can form layers from about 10 to about 200 microns thick, allowing the fused layers of the printed part to have roughly the same thickness. This can provide a resolution in the z-axis direction of about 10 to about 200 microns. The polymer powder can also have a sufficiently small particle size and sufficiently regular particle shape to provide about 10 microns to about 200 microns resolution along the x-axis and y-axis.

In some examples, the thermoplastic polymer powder can be colorless. For example, the polymer powder can have a white, translucent, or transparent appearance.

The thermoplastic polymer powder can have a fusing temperature from about 70° C. to about 350° C. In further examples, the polymer can have a fusing temperature from about 150° C. to about 200° C. As used herein, "fusing temperature" refers to the lowest temperature at which particles of the thermoplastic polymer powder fuse together to form a solid object. In some cases, this temperature can be referred to as a melting temperature, softening temperature, or flow temperature. Not all thermoplastic polymers have a specific melting temperature, as some polymers experience a gradual reduction in viscosity with increasing temperature. With such polymers, the particles can begin to flow sufficiently to fuse with neighboring polymer particles at the fusing temperature.

In some examples, the thermoplastic polymer powder can be polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder, polypropylene powder, polyester powder, polycarbonate powder, polyether ketone powder, polyacrylate powder, polystyrene powder, polyvinylidene fluoride powder or a combination thereof.

In a specific example, the polymer powder can be a polyamide powder such as polyamide-11 or polyamide-12, which can have a melting point from about 180° C. to about 200° C. In some examples, the polyamide powder can be a semi-crystalline powder having a degree of crystallinity from 10% to 90%, which can be measured using differential scanning calorimetry. The polyamide powder can have a recrystallization temperature from 130° C. to 160° C. Additionally, the polyamide powder can have an enthalpy of fusion from 80 J/g to 130 J/g.

In further examples, the polyamide powder can have a number average molecular weight $M_n$ from 10,000 to 500,000 and a polydispersity index (defined as $M_w/M_n$) from 1 to 5. Additionally, the molecular weight of polyamide powder can be characterized using solution viscosity as a proxy for molecular weight. "Solution viscosity" is defined by combining about 0.5 wt % polyamide-12 powder with about 99.5 wt % M-cresol and measuring the viscosity of the admixture. Further details for determining solution viscosity under this measurement protocol are described in International Standard ISO 307, Fifth Edition, 2007-05-15. In some examples, the polyamide powder used in the three-dimensional printing kits of the presently disclosed technology can have a solution viscosity from about 1.4 to about 2.0.

The thermoplastic polymer powder can also in some cases be blended with a filler. The filler can include inorganic particles such as alumina, silica, glass particles, metal particles, or ceramic particles, e.g. glass beads, steel balls, or metal grains, or other pigments, e.g. transition metal oxides, or combinations thereof. When the thermoplastic polymer powder fuses together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer powder to filler particles can be from about 99.9:0.1 to about 1:2, from about 99:1 to about 1:1, or from about 5:1 to about 1:1. The filler particles can have a variety of particle sizes depending on the type of filler material. In some examples, the filler particles can have an average particle size from about 5 nm to about 200 microns, from about 10 nm to about 150 microns, or from about 100 nm to about 100 microns.

Food Contact Compliant Three-Dimensional Printing System Examples

Figure 2:
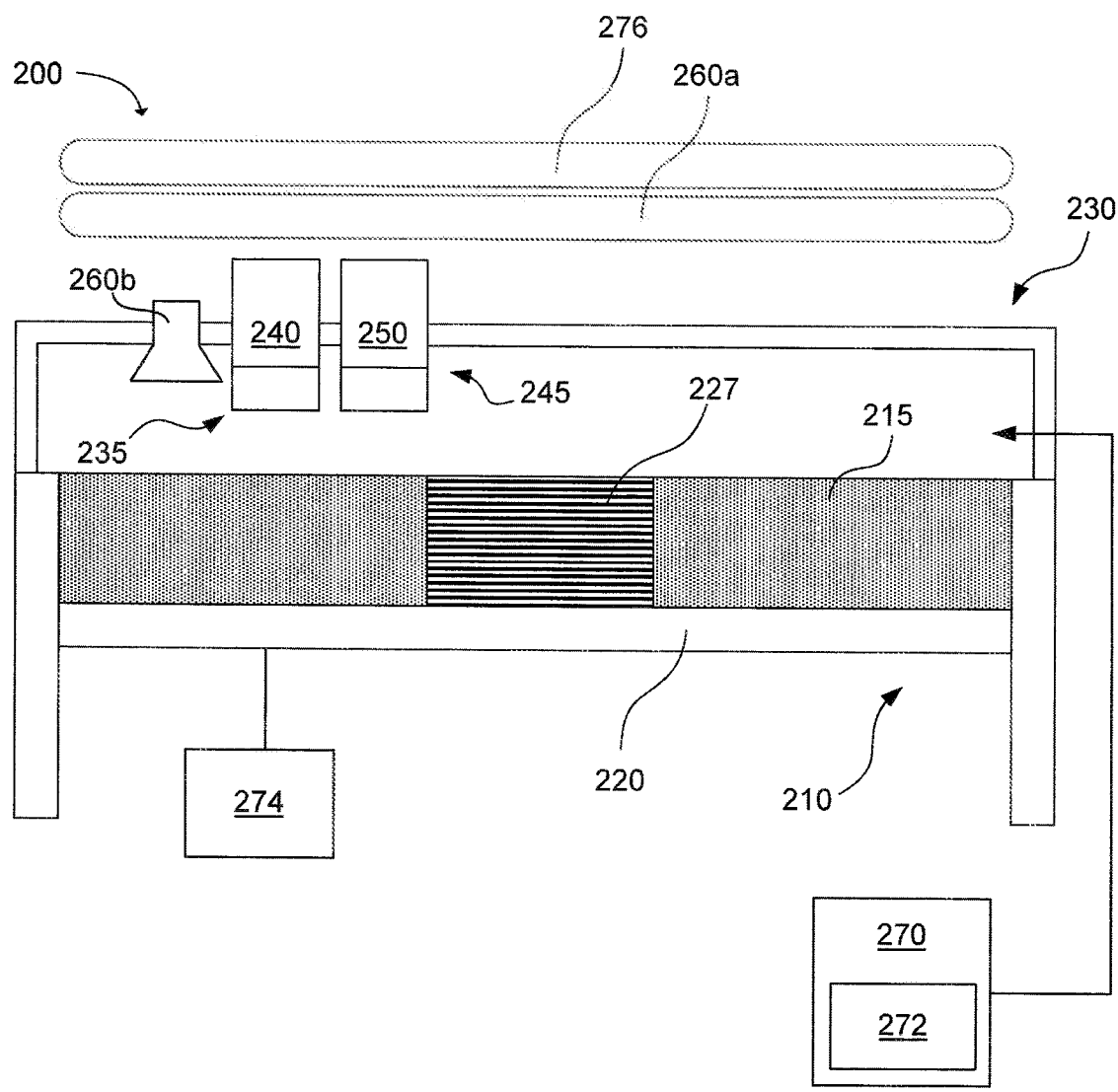
FIG. 2 is a schematic view of a three-dimensional printing system in accordance with examples of the present disclosure.

In addition to the kits and compositions described above, the present technology also encompasses three-dimensional printing systems that include the kits and compositions discussed hereinabove. An example of a three-dimensional printing system is shown in FIG. 2. The system 200 includes a powder bed 210 including a powder bed material 215, which includes the thermoplastic polymer powder described herein and has an average particle size from about 10 microns to about 200 microns. In the example shown, the powder bed has a build platform or moveable floor 220 that allows the powder bed to be lowered after the individual layers of the three-dimensional part are printed. The three-dimensional part 227 is shown after printing the food contact compliant fusing agent 240 on the powder bed material. The system also includes a fluid jet printer 230 that includes a first fluid ejector 235 in communication with a reservoir of the fusing agent 240. The first fluid ejector can be configured to print the food contact compliant fusing agent onto the powder bed. A second fluid ejector 245 is in communication with a reservoir of a food contact compliant detailing agent 250. The second fluid ejector can be configured to print the food contact compliant detailing agent onto the powder bed. In some examples, the three-dimensional printing system can also include additional fluid ejectors in communication with a reservoir of fluid to provide other colors and/or functionality.

After the food contact compliant fusing agent 240 has been printed onto the powder bed material 215, a fusing radiation source, such as a fusing lamp 260*a* or 260*b*, can be used to expose the powder bed to electromagnetic radiation sufficient to fuse the powder that has been printed with the food contact compliant fusing agents. Fusing lamp 260*a* may be a stationary fusing lamp that rests above the powder bed, and fusing lamp 260*b* may be carried on a carriage with the fluid ejectors 235, 245. To print the next layer, the moveable floor is lowered and a new layer of powder bed material is added above the previous layer. Unused powder bed material, such as that shown at 215, is not used to form the three-dimensional part, and thus, can be recycled for future use. Recycling can include refreshing the used powder bed material with a relatively small percentage of fresh powder bed material, e.g., as little as up to about 20 wt %, up to about 10 wt %, or up to about 5 wt %.

To achieve good selectivity between the fused and unfused portions of the powder bed, the food contact compliant fusing agents can absorb enough electromagnetic radiation or energy to boost the temperature of the thermoplastic polymer powder above the melting or softening point of the polymer, while unprinted portions of the powder bed remain below the melting or softening point. Thus, as mentioned, the three-dimensional printing system can include preheaters for preheating the powder bed material to a temperature near the melting or softening point. In one example, the system can include a preheater(s) to heat the powder bed material prior to printing. For example, the system may include a print bed heater 274 to heat the print bed to a temperature from about 100° C. to about 160° C., or from about 120° C. to about 150° C. The system can also include a supply bed or container 270 which also includes a supply heater 272 at a location where polymer particles may be stored before being spread in a layer onto the powder bed 210. The supply bed or container can utilize the supply heater to heat the supply bed or container to a temperature from about 90° C. to about 140° C. Thus, when an overhead heating source 376, e.g., heating lamps, may be used to heat up the powder bed material to a printing temperature, the typical minimum increase in temperature for printing can be carried out quickly, e.g., up to about 160° C. to about 220° C. To be clear, the overhead heating source used to heat the powder bed material for printing is typically a different energy source than the electromagnetic radiation source, e.g., fusing lamp 260*a* or 260*b*, used to thermally activate the energy absorber, though these energy sources could be the same depending on the energy absorber and powder bed material chosen for use.

Suitable fusing radiation sources or fusing lamps for use in the three-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse the individual printed layer. The fusing lamp can be configured to irradiate the entire powder bed with a substantially uniform amount of energy. This can selectively fuse the printed portions with fusing agents leaving the unprinted portions of the powder bed material below the fusing temperature of the polymer powder.

Depending on the amount of energy absorber present in the polymer powder, the absorbance of the energy absorber, the preheat temperature, and the fusing temperature of the polymer powder, an appropriate amount of irradiation can be supplied from the fusing radiation source or lamp. In some examples, the fusing lamp can irradiate individual layers from about 0.5 to about 10 seconds per pass.

EXAMPLES

The following illustrates examples of the present disclosure. However, it is to be understood that the following is illustrative of the application of the principles of the present disclosure. Numerous modifications and alternative compositions, methods, and systems may be devised without departing from the scope of the present disclosure. The appended claims are intended to cover such modifications and arrangements.

Example 1—Fusing Agents

An example food contact compliant fusing agent according to the present disclosure was prepared (FA) and a comparative example fusing agent (CFA) was prepared with a different formulation. The ingredients in the fusing agent and the comparative fusing agent are shown in Table 2 below.

TABLE 2

Example Food Contact Compliant Fusing Agents

| Component | % active | FA wt % | CFA wt % |
|---|---|---|---|
| Food contact compliant carbon black dispersion | 15.5 | 1-10 | 1-10 |
| Glycerol | 100 | 0 | 10 |
| Propylene Glycol | 100 | 10 | 0 |
| Polyethylene Glycol 300 | 100 | 5 | 5 |
| Dioctyl sulfosuccinate sodium salt | 100 | 0.1-0.3 | 0.1-0.3 |
| 2-phenoxyethanol | 100 | 0.8-1.5 | 0.8-1.5 |
| Deionized water | 100 | balance | balance |

Both the example fusing agent FA and the comparative fusing agent CFA were found to be printable using an inkjet printhead.

Example 2—Detailing Agents

An example food contact compliant detailing agent (DA) and a comparative food contact compliant detailing agent (CDA) were prepared from the ingredients shown in Table 3 below.

TABLE 3

Food Contact Compliant Detailing Agents

| Component | % active | DA wt % | CDA wt % |
|---|---|---|---|
| Glycerol | 100 | 5 | 10 |
| Propylene Glycol | 100 | 20 | 10 |
| Sodium bicarbonate | 100 | 0.01-0.05 | 0.01-0.05 |

TABLE 3-continued

Food Contact Compliant Detailing Agents

| Component | % active | DA wt % | CDA wt % |
|---|---|---|---|
| EDTA - disodium salt | 100 | 0.01-0.05 | 0.01-0.05 |
| 2-phenoxyethanol | 100 | 0.8-1.5 | 0.8-1.5 |
| Dioctyl sulfosuccinate sodium salt | 100 | 0.1-0.3 | 0.1-0.3 |
| Deionized water | 100 | balance | balance |

The example detailing agent and the comparative detailing agent were both found to be printable using an inkjet printhead.

Example 3—Browning Tests

The fusing agents and detailing agents were combined with polymer powder and then subjected to accelerated ageing conditions to test the level of browning or yellowing that occurred. Two types of tests were performed: melt tests, in which the polymer powder was heated above its melting point and the molten polymer was observed for browning; and powder blend tests, in which the powder was heated at a lower temperature for a longer time, but not melted. These tests were performed with both polyamide-12 and polyamide-11 powder.

In the melt tests, the fluid agents were mixed with polymer powder at a 1:9 weight ratio of fluid agent to powder. The mixtures were then heated in an oven. For the polyamide-12 powder, the mixtures were heated at 207° C. for 2 hours. For the polyamide-11 powder, the mixtures were heated at 220° C. for 2 hours. After heating, the mixtures were observed visually to determine the degree of browning. This test was performed with the example fusing agent (FA), example detailing agent (DA), comparative fusing agent (CFA), and comparative detailing agent (CDA). For additional comparison, the tests were also performed with polymer powder (polyamide-12 and polyamide-11) without any fluid agent added, and with powder that had been mixed with another non-food-contact-compliant fusing agent and a non-food-contact-compliant detailing agent.

The same trend was observed for the fusing agents and the detailing agents, with both types of polymer powder. The least browning occurred with the polymer powder that was melted without any fluid agent being added. The comparative fusing agent and the comparative detailing agent both had the highest degree of browning. The example fusing agent and detailing agent in accordance with the present disclosure had much less browning than the comparative fluid agents. The exceptionally low degree of browning was unexpected with the relatively minor differences between the formulations of the comparative fluid agents and the example fluid agents. To summarize the differences, the example fluid agents included a smaller concentration of glycerol and a larger concentration of propylene glycol. Otherwise, the fluid agents were very similar. For comparison, the non-food-contact-compliant fusing agent and detailing agent caused slightly more browning than the example fusing agent and the example detailing agent.

For the powder blend tests, the polymer powder was blended with the fluid agents at a 1:9 weight ratio of fluid agent to powder and then heated at a temperature below the melting temperature of the polymer. For the polyamide-12 powder, the mixture was heated at 165° C. for 20 hours. For the polyamide-11 powder, the mixture was heated at 177° C. for 20 hours. Again, the test was also performed with polymer powder without a fluid agent and polymer powder mixed with the non-food-contact-compliant fluid agents for comparison. The same trend was observed as with the melting tests. The example fusing agent and detailing agent provided much less browning than the comparative fusing agent and detailing agent, to a surprising degree. The non-food-contact-compliant fusing agent and detailing agent provided slightly more browning than the example fusing agent and detailing agent.

Example 4—Solution Viscosity

Figure 3:
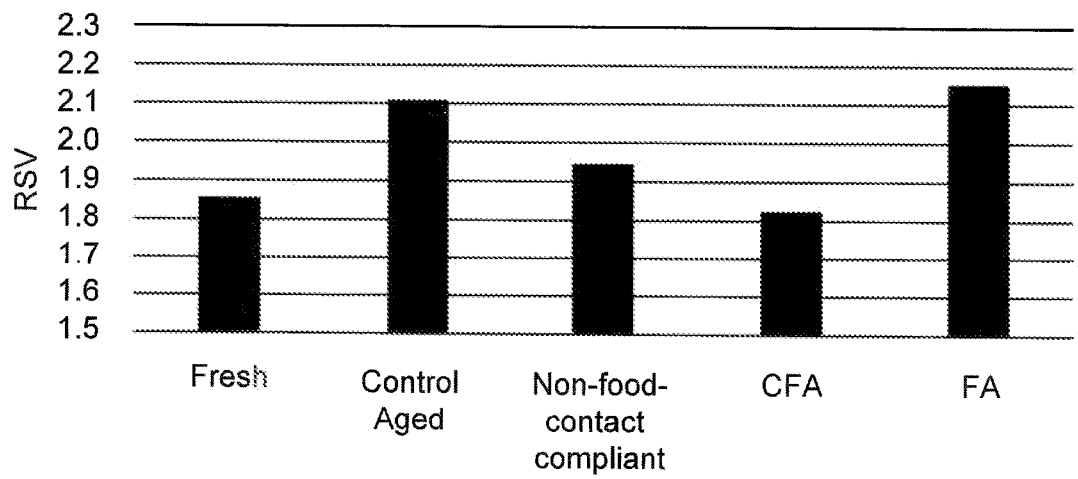
FIG. 3 is a graph of relative solution viscosity of polyamide-12 polymer that had been mixed with the various fusing agents and heated at 207° C. for 2 hours.
Figure 4:
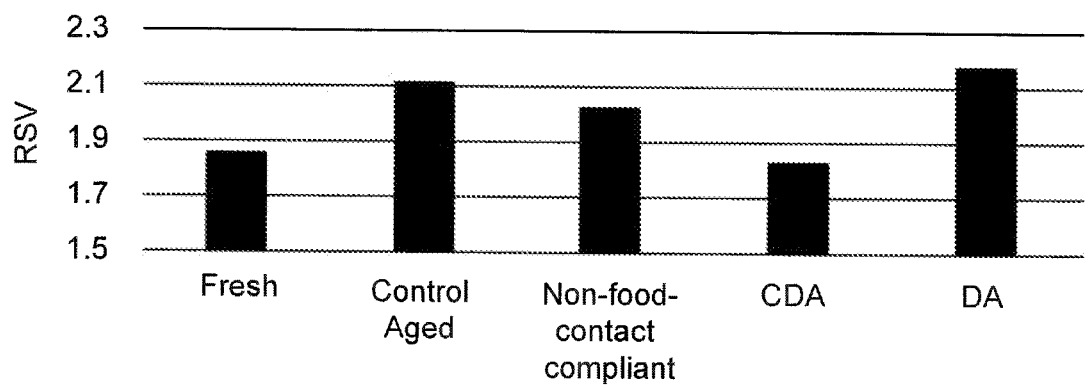
FIG. 4 is a graph of relative solution viscosity of polyamide-12 polymer that had been mixed with the various detailing agents and heated at 207° C. for 2 hours.
Figure 5:
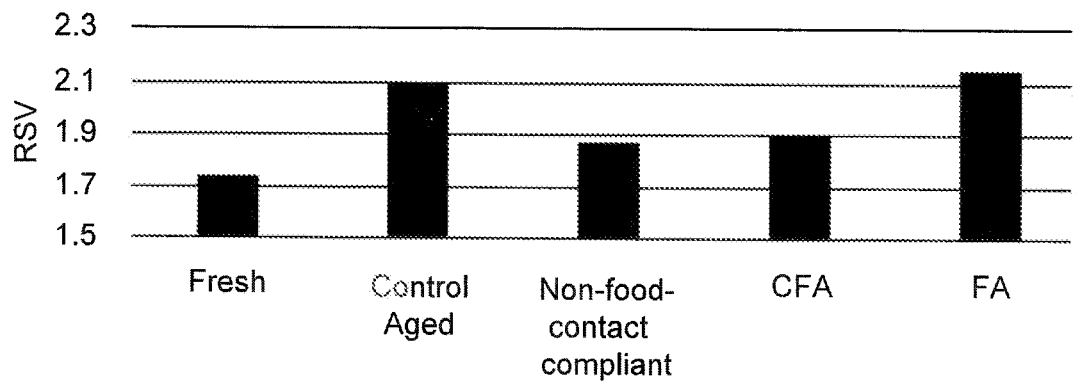
FIG. 5 is a graph of relative solution viscosity of polyamide-11 polymer mixed with the fusing agents and heated at 220° C. for 2 hours.
Figure 6:
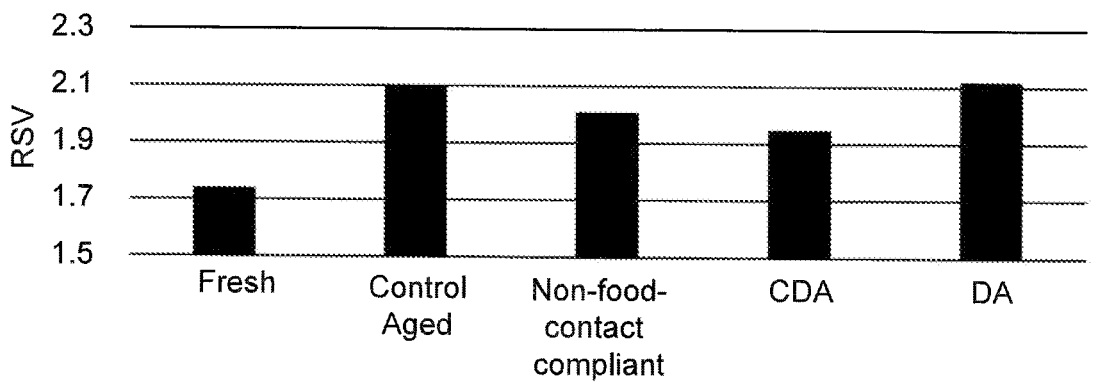
FIG. 6 is a graph of relative solution viscosity of polyamide-11 polymer mixed with the detailing agents and heated at 220° C. for 2 hours.

The melted and re-solidified polymer mixtures from the melting tests described above were used to measure the solution viscosity of the polymers. To measure the solution viscosity, a piece of the melted and re-solidified polymer/agent mixture was dissolved in m-cresol at a concentration of 0.5 wt %. The solution viscosity was then measured using a MINIPV®-HX solution polymer viscometer, available from Cannon Instrument Company (USA). The results are shown as relative solution viscosity values in the graphs of FIGS. 3-6. FIG. 3 shows the relative solution viscosity of polyamide-12 polymer that had been mixed with the various fusing agents and heated at 207° C. for 2 hours. FIG. 4 shows the relative solution viscosity of polyamide-12 polymer that had been mixed with the various detailing agents and heated at 207° C. for 2 hours. FIG. 5 shows the relative solution viscosity of polyamide-11 polymer mixed with the fusing agents and heated at 220° C. for 2 hours. FIG. 6 shows the relative solution viscosity of polyamide-11 polymer mixed with the detailing agents and heated at 220° C. for 2 hours. For additional comparison, the solution viscosity of fresh, unaged polyamide-12 or polyamide-11 powder was also measured.

The results show that the example fusing agent and detailing agent provided comparable, or even slightly higher, solution viscosity compared to the aged polymer that did not have any fluid agent applied thereto. However, the comparative fusing agent and comparative detailing agent both resulted in significantly lower solution viscosity, indicating degradation of the polymer. These results suggest that the polymer degradation is less with the example fusing agent and detailing agent. This could allow for the powder bed material to be recycled for more print cycles when the example fusing agent and detailing agent are used.

Definitions

It is noted that, as used in this specification and the appended claims, the singular forms "a," "an," and "the" include plural referents unless the context clearly dictates otherwise.

As used herein, "liquid vehicle" refers to a liquid in which additives may be placed to form fluid jettable formulations, such as fusing agent, detailing agents, inks, functional fluids, etc. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc.

The term "fluid" herein does not exclude solid additives that may be suspended therein, as fluid can include both solutions and fine dispersions, such as in fusing agents, detailing agents, inks, functional fluids, etc.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" includes pigment colorants, magnetic particles, aluminas, silicas, and/or other ceramics, organo-metallics or other opaque particles, whether or not such particulates impart color. Thus, though the present description describes the use of pigment colorants, the term "pigment" can be used to describe pigment colorants, and also other pigments such as organometallics, ferrites, ceramics, etc. In one specific aspect, however, the pigment is a pigment colorant.

As used herein, "soluble," refers to a solubility percentage of more than 5 wt %.

As used herein, "fluid jetting" or "jetting" refers to compositions that may be ejected from jetting architecture, such as inkjet architecture or fluid jet architecture, e.g., thermal or piezo architecture. Additionally, such architecture can be configured to print varying drop sizes such as less than 10 picoliters, less than 20 picoliters, less than 30 picoliters, less than 40 picoliters, less than 50 picoliters, etc.

The term "thermoplastic polymer powder" refers to relatively fine thermoplastic particles with an average particle size from 10 μm to 200 μm. The thermoplastic polymer powder can have a melting or softening point from about 70° C. to about 350° C., and can include polymers such as nylons or polyamides, polyethylenes, thermoplastic polyurethanes, polypropylenes, polyesters, polycarbonates, polyether ketones, polyacrylates, polystyrenes, etc. The term "powder" can be used interchangeably with "particle" or "particulate."

As used herein, the term "food contact compliant" is meant to include components and/or materials that are considered compliant under EU and/or US regulations for use in various food contact applications. These "food contact compliant" components and/or materials described herein are meant to be used for applications such as food contact compliant materials (e.g., food packaging), cosmetic contact compliant materials (e.g., cosmetic packaging or products such as mascara wands), and other regulated consumer applications.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein. In some examples, "a little above" or "a little below" mean less than 5%.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if the numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

What is claimed is:

1. A multi-fluid kit for three-dimensional printing, the multi-fluid kit comprising:
    a food contact compliant fusing agent comprising:
        from about 70 wt % to about 96 wt % of water based on a total weight of the food contact compliant fusing agent;
        a food contact compliant carbon black dispersion present in an amount of from about 3 wt % to about 10 wt % by solids weight of the carbon black dispersion out of the total weight of the food contact compliant fusing agent; and
        food grade propylene glycol present in an amount of from about 1 wt % to about 15 wt % based on the total weight of the food contact compliant fusing agent; and
    a food contact compliant detailing agent comprising:
        from about 70 wt % to about 90 wt % of water based on a total weight of the food contact compliant detailing agent;
        food grade propylene glycol present in an amount from about 10 wt % to about 25 wt % based on the total weight of the food contact compliant detailing agent; and
        a food contact compliant chelating compound present in an amount of from about 0.01 wt % to about 1 wt % based on the total weight of the food contact compliant detailing agent.

2. The multi-fluid kit of claim 1, wherein the food contact compliant fusing agent is devoid of glycerol or includes food grade glycerol in an amount from about 0.1 wt % to about 6 wt % based on the total weight of the food contact compliant fusing agent.

3. The multi-fluid kit of claim 1, wherein the food contact compliant detailing agent further comprises food grade glycerol in an amount from about 1 wt % to about 6 wt % based on the total weight of the food contact compliant detailing agent.

4. The multi-fluid kit of claim 1, wherein the food contact compliant fusing agent further comprises polyethylene glycol in an amount from about 1 wt % to about 10 wt % based on the total weight of the food contact compliant fusing agent.

5. The multi-fluid kit of claim 1, wherein the food contact compliant fusing agent further comprises 2-phenoxyethanol in an amount from about 0.2 wt % to about 1 wt % based on the total weight of the food contact compliant fusing agent.

6. The multi-fluid kit of claim 1, wherein the food contact compliant detailing agent comprises from about 70 wt % to about 75 wt % of the water based on the total weight of the food contact compliant detailing agent.

7. The multi-fluid kit of claim 1, wherein the food contact compliant chelating compound is disodium ethylenediaminetetraacetate dihydrate.

8. A three-dimensional printing kit, comprising:
a food contact compliant fusing agent comprising:
from about 70 wt % to about 96 wt % of water based on a total weight of the food contact compliant fusing agent;
a food contact compliant carbon black dispersion present in an amount of from about 3 wt % to about 10 wt % by solids weight of the carbon black dispersion out of the total weight of the food contact compliant fusing agent; and
food grade propylene glycol present in an amount of from about 1 wt % to about 15 wt % based on the total weight of the food contact compliant fusing agent;
a food contact compliant detailing agent comprising:
from about 70 wt % to about 90 wt % of water based on a total weight of the food contact compliant detailing agent;
food grade propylene glycol present in an amount from about 10 wt % to about 25 wt % based on the total weight of the food contact compliant detailing agent; and
a food contact compliant chelating compound present in an amount of from about 0.01 wt % to about 1 wt % based on the total weight of the food contact compliant detailing agent; and
a thermoplastic polymer powder.

9. The three-dimensional printing kit of claim 8, wherein the thermoplastic polymer powder is selected from a group consisting of polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder, polypropylene powder, polyester powder, polycarbonate powder, polyether ketone powder, polyacrylate powder, polystyrene powder, polyvinylidene fluoride powder, and a combination thereof.

10. The three-dimensional printing kit of claim 8, wherein the thermoplastic polymer powder has an average particle size from about 10 microns to about 200 microns.

11. The three-dimensional printing kit of claim 8, wherein the food contact compliant fusing agent is devoid of glycerol or includes food grade glycerol in an amount from about 0.1 wt % to about 6 wt % based on the total weight of the food contact compliant fusing agent, and wherein the food contact compliant detailing agent further comprises food grade glycerol in an amount from about 1 wt % to about 6 wt % based on the total weight of the food contact compliant detailing agent.

12. The three-dimensional printing kit of claim 8, wherein the food contact compliant fusing agent further comprises polyethylene glycol in an amount from about 1 wt % to about 10 wt % based on the total weight of the food contact compliant fusing agent.

13. A three-dimensional printing system, comprising:
a powder bed comprising a thermoplastic polymer powder;
a fluid jet printer, comprising:
a first fluid ejector in communication with a reservoir of a food contact compliant fusing agent to print the food contact compliant fusing agent onto the powder bed, wherein the food contact compliant fusing agent comprises: about 70 wt % to about 96 wt % of water based on a total weight of the food contact compliant fusing agent, a food contact compliant carbon black dispersion present in an amount of from about 3 wt % to about 10 wt % based on the total weight of the food contact compliant fusing agent, and food grade propylene glycol in an amount of from about 1 wt % to about 15 wt % based on the total weight of the food contact compliant fusing agent; and
a second fluid ejector in communication with a reservoir of a food contact compliant detailing agent to print the food contact compliant detailing agent onto the powder bed, wherein the food contact compliant detailing agent comprises: from about 70 wt % to about 90 wt % of water based on a total weight of the food contact compliant detailing agent, food grade propylene glycol present in an amount from about 10 wt % to about 25 wt % based on the total weight of the food contact compliant detailing agent, and a food contact compliant chelating compound present in
an amount of from about 0.01 wt % to about 1 wt % based on the total weight of the food contact compliant detailing agent; and
a fusing radiation source to expose the powder bed to electromagnetic radiation sufficient to fuse thermoplastic polymer powder that has been printed with the food contact compliant fusing agent.

14. The three-dimensional printing system of claim 13, wherein the food contact compliant fusing agent further comprises dioctyl sulfosuccinate sodium salt, and wherein the food contact compliant fusing agent does not comprise sodium dodecyl sulfate.

15. The three-dimensional printing system of claim 13, wherein the food contact compliant fusing agent is devoid of glycerol or includes food grade glycerol in an amount from about 0.1 wt % to about 6 wt % based on the total weight of the food contact compliant fusing agent, and wherein the food contact compliant detailing agent further comprises food grade glycerol in an amount from about 1 wt % to about 6 wt % based on the total weight of the food contact compliant detailing agent.

16. The multi-fluid kit of claim 1, wherein the food contact compliant detailing agent further comprises 2-phenoxyethanol in an amount from about 0.2 wt % to about 1 wt % based on the total weight of the food contact compliant detailing agent.

* * * * *